(12) United States Patent
Arez et al.

(10) Patent No.: US 7,828,326 B2
(45) Date of Patent: Nov. 9, 2010

(54) ADAPTIVE AIRBAG WITH A TENSION RETENSION BAND THAT SHAPES BAG AREAS INTO A V

(75) Inventors: Luis Arez, Valladolid (ES); Isabelle Denys, Valladolid (ES); Joana Francisca Tavares Da Silva, Valladolid (ES); Azucena Pérez Garcia, Valladolid (ES)

(73) Assignee: Dalphi Metal España S.A., Madrid (ES)

( * ) Notice: Subject to any disclaimer, the term of this patent is extended or adjusted under 35 U.S.C. 154(b) by 164 days.

(21) Appl. No.: 12/175,074

(22) Filed: Jul. 17, 2008

(65) Prior Publication Data

US 2009/0026746 A1    Jan. 29, 2009

(30) Foreign Application Priority Data

Jul. 27, 2007   (EP) .................................. 07381055

(51) Int. Cl.
*B60R 21/16* (2006.01)
*B60R 21/30* (2006.01)
(52) U.S. Cl. .................. 280/739; 280/730.2; 280/743.2
(58) Field of Classification Search ................. 280/739, 280/743.2, 730.2
See application file for complete search history.

(56) References Cited

U.S. PATENT DOCUMENTS 7,497,467 B2 *   3/2009   Chida et al. .................. 280/739
2009/0020991 A1 *   1/2009   Abe et al. .................... 280/739

FOREIGN PATENT DOCUMENTS

EP          001640221 A1 *   3/2006
WO    WO 2007/003418 A1 *   1/2007

* cited by examiner

*Primary Examiner*—Eric Culbreth
(74) *Attorney, Agent, or Firm*—Ladas & Parry LLP

(57) ABSTRACT

Airbag module for protecting an occupant of car with a bag (11) that includes a main front panel (17) and main rear panel (19) connected by its ends and a retention band (21) connected to the panels in two opposite ends (31, 33), capable of withstanding maximum pressure during the unfolding of the bag (11) without breaking or disconnecting from said panels, and whose length L is less than the maximum distance D that would exist between said opposite areas (31, 33) during the unfolding of the bag should said retention band (21) not exist; the bag has a ventilation orifice (23) around one of the union areas (31, 33) that can be covered by the main front and rear panels (17, 19) when the bag (11) contacts the occupant (15).

10 Claims, 3 Drawing Sheets

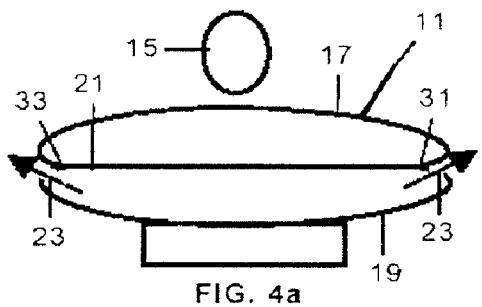 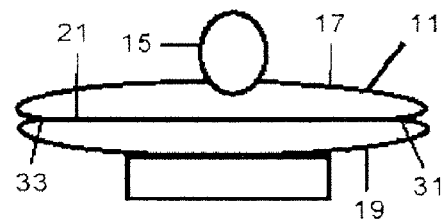
FIG. 4a　　　　　　　　　　FIG. 4b
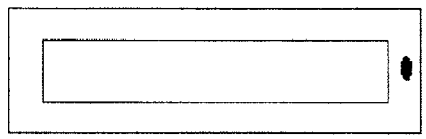 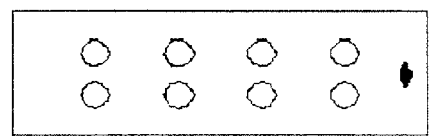
FIG. 5a　　　　　　　　　　FIG. 5b
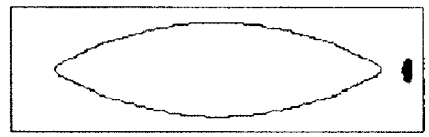 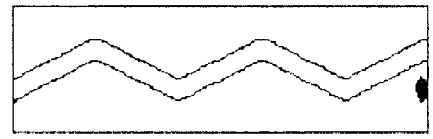
FIG. 5c　　　　　　　　　　FIG. 5d
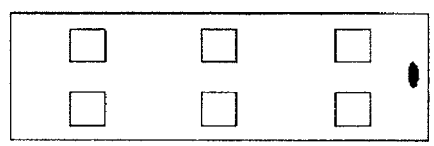 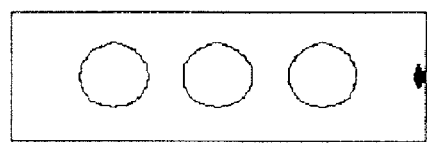
FIG. 5e　　　　　　　　　　FIG. 5f
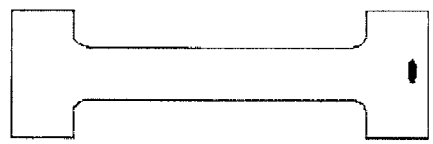
FIG. 5g

ADAPTIVE AIRBAG WITH A TENSION RETENSION BAND THAT SHAPES BAG AREAS INTO A V

INVENTION FIELD

This invention refers to an airbag module used in cars to absorb impacts suffered by drivers and passengers in the event of crashes or collisions and, more specifically, an airbag module that has to adapt to crashes or collisions of varying severity.

INVENTION BACKGROUND

An airbag module basically consists in a folded bag that inflates quickly through gas produced by a generator when certain sensor devices detect a vehicle collision. This way the bag unfolds between the vehicle occupant and a part of the vehicle, protecting the occupant during a collision.

During normal operation of bag unfolding, the internal pressure produced by the generator on filling it with gas can be sufficiently high to make the bag so hard that the occupant bounces back. In order to avoid this inconvenience they are provided with a ventilation orifice that serves to reduce pressure inside the bag and, therefore, the possibility of causing damages when they are activated.

Furthermore, several methods have been used to close this ventilation orifice in order to improve pressure control inside the bag than that offered by the variation in size of the hole. In this sense, it is worth highlighting the use of patches to ensure the gas is not immediately released through the discharge orifice, but when the patch breaks on reaching a certain pressure inside the bag. The technology has proposed different types of patches with different means to control their breaking depending, to a greater or lesser extent, on a given resistance to gas pressure inside the bag. This makes the presence of gas pressure necessary for the bag to fulfil its protection function compatible with the guarantee that the gas pressure shall not be excessive, with the consequent risk to persons the bag unfolds for.

In addition, the need for some ventilation devices has emerged that allow increasing the flow of gas out depending on specific characteristics of each collision and the type of passenger affected, and in this sense there are several solutions of ventilation devices that offer adjustable surface ventilation orifices to increase the ventilation area as the interior pressure increases in the bag.

A new requirement proposes the need of airbags that can reduce the ventilation area, even eliminating it completely, under certain impact conditions, which requires sealing mechanisms that must work opposite to that indicated. Traditional patches, mentioned above, should completely cover the outlet orifice until the gas pressure inside bag reached a certain level and then broke; now the opposite is required: devices that can cover the ventilation orifice under certain situations. We know of some proposals on this matter such as:

Patent ES 2182629, U.S. Pat. No. 6,139,048, patent request US 2004/0090054, patent request WO 2006/024472 and patent request US 2006/0151979 describe devices that use movable elements to seal a ventilation orifice maximizing tensions produced in the bag due to the difference in pressure next to the difference in the form of occupant load.

Patent requests EP 1 640 221 and WO 2007/003418 describe passive mechanisms for ventilation control using elements that seal the ventilation orifice in the event of certain conditions.

An inconvenience of the aforementioned proposals is that they lack sufficient adaptive capacity for different crash configurations.

This invention is targeted to resolve this inconvenience.

SUMMARY OF THE INVENTION

An objective of this invention is to provide an airbag module with ventilation adjustable to different crash or collision severity conditions. The goal is to have different crash configurations and the corresponding evolutions (increase of impact speed, . . .) considered by the administrative regulations and/or demanded by consumers.

Another objective is this invention is to provide an airbag module that can reduce gas leaks to the outside in order to increase performance.

Another objective of this invention is to provide an airbag module configured to protect an occupant of a vehicle against a lateral impact in order to control the effort applied to the side of the occupant, i.e.: the thorax, abdomen or pelvis depending on requirements. Controlling the effort allows avoiding damage to the occupant.

Another objective of this invention is to provide an airbag module configured to protect an occupant of a vehicle against a frontal impact controlling the effort applied to the occupant, avoiding damage.

These and other objectives are achieved through an airbag module for protecting the occupant of a car with a generator-produced gas-inflatable bag in the event of a collision that is configured to unfold between the occupant and the vehicle and which includes a primary front panel destined to contact the occupant and a primary rear panel connected to its periphery ends, as well as a retention band connected by its ends to said primary front and rear parts in two opposite areas of the periphery ends, capable of withstanding the maximum pressure defined during the unfolding of the bag without breaking or disjoining from said primary front and rear panels and with a length L that is less than the maximum distance D between said opposite areas during the unfolding of the bag should there not be such retention band, and at least one ventilation orifice in one of the panels located near one of the band union areas of the retention band in order to be sealed when nearing the main front and rear panels when the bag contacts the occupant.

An advantage of this invention is that the adaptability of the airbag module to crash conditions is of passive type and therefore does not require any signal to activate it.

Another advantage of this invention is the low cost involved to provide a conventional airbag with adaptability to crash conditions.

Other characteristics and advantages of this invention shall be drawn from the detailed description followed by several illustrations, which are never limiting, of its purpose with regards to the attached drawings.

DESCRIPTION OF FIGURES

FIGS. 4a and 4b are horizontal schematic views of a frontal airbag module as per the invention that illustrate the sealing of a ventilation orifice that occurs when the bag hits the occupant.

FIGS. 5a-5g are schematic views of different configurations of the retention band of the airbag modules as per this invention.

DETAILED DESCRIPTION OF THE INVENTION

Figure 1A:
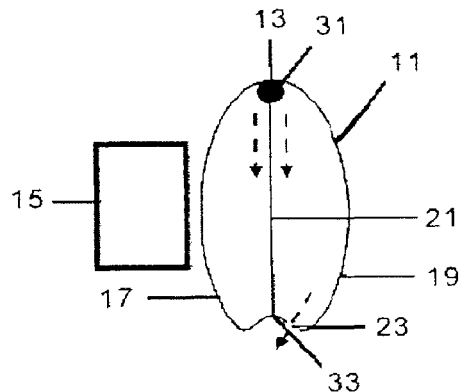
FIGS. 1a and 1b are horizontal schematic views of a side airbag module as per the invention that illustrate the sealing of a ventilation orifice that occurs when the bag hits the occupant.
Figure 1B:
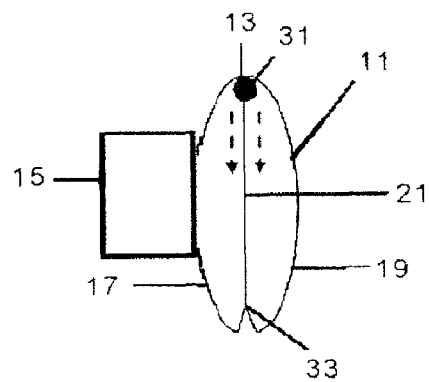

A typical lateral airbag module, as illustrated in FIGS. 1a-1b and 2a-2b, includes an inflatable bag 11 with the gas produced by a generator 13 in the event of a collision and is configured to unfold between an occupant 15 and an area of the vehicle.

Although in FIGS. 1a-1b and 2a-2b, the bag 11 is represented by a single chamber for simplicity, it is usually structured in two or more chambers in order to provide more efficient protection of the head, thorax and pelvis of the occupant that represent different problems in the event of side impacts.

The bag consists of a main front panel 17 and a main rear panel 19 connected by the perimeter ends through seams (not represented). As any expert on this matter would understand, the union method of the panels is not a limitation of this invention, which is also applicable to bags consisting of a single piece.

In the case of bags with more than one chamber, there can be other panels connected to main front and rear panels 17, 19 to form such chambers.

As per this invention, bag 11 includes a retention band 21 and, at least, one ventilation orifice 23.

The retention band 21 is connected to two opposite areas 31, 33, which are at opposite ends on the perimeter of the main front and rear panels 17, 19 of the bag 11, so that it is parallel to the bag impact surface. Its length L is less than the maximum distance D between said opposite areas 31 and 33 during the unfolding of the bag without the retention band 21, so that, as illustrated in the Figures, it limits the unfolding of a bag in a direction parallel to impact surface of the bag 11.

This configuration forms a v-shaped area in the surrounding area of the union area 33 opposite to the union area 31.

In a preferential execution, the relation between length L and distance D ranges between 0.6 and 0.9.

This V-shape area includes at least one ventilation orifice 23 that can be open on contact between bag 11 and occupant 15 and so it can be covered when bag 11 loads during its interaction with occupant 15.

In the first case, illustrated in FIG. 1a, the angle of the V is big and allows evacuating gas through the ventilation orifice 23. In the second case, illustrated in FIG. 1b, the V-shaped angle is reduced hindering the evacuation of gas through the ventilation orifice 23 until it is covered when such angle is very small.

In a frontal airbag module as represented in FIGS. 4a and 4b, the only difference (with regards to this invention) with a side airbag module as we have been describing is there are ventilation orifices 23 around the two union areas 31, 33 of the retention band 21 to the bag 11, which would both adopt the V shape as neither of them is secured to the vehicle.

Figure 6:
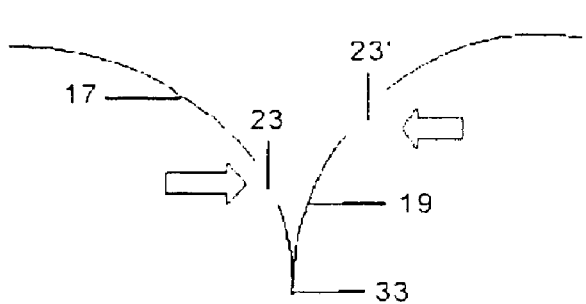
FIG. 6 is a schematic view of the airbag module bag area as per this invention where the ventilation orifices are located.
Figure 7:
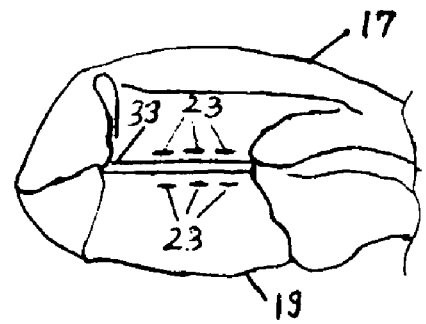
FIG. 7 is a photo of an airbag as per this invention with multiple ventilation orifices.

As illustrated in FIGS. 6 and 7, there are several ventilation orifices 23, 23' at varying distances from the vertex of the V. The greater distance delays the covering of the ventilation orifices during contact of bag 11 with occupant 15.

The number, size and specific position of the ventilation orifices depend on the behaviour control of the airbag module as per this invention.

The airbag module as per this invention may include a sealing patch of the ventilation orifices 23, or any other device with a similar function, that breaks when the pressure inside the bag 11 reaches a predetermined magnitude, which will normally be provided so that the rupture takes place before the bag 11 contacts the occupant 15.

Figure 2A:
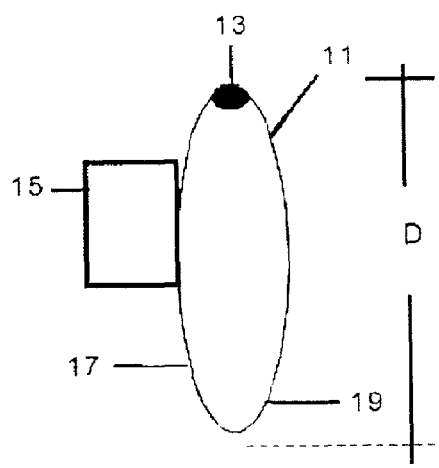
FIGS. 2a and 2b are horizontal schematic views of a side airbag module as per the invention that illustrate the expansion of the contact area with the occupant.
Figure 2B:
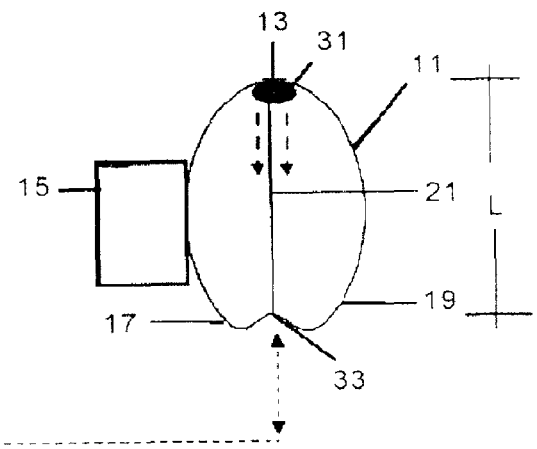

Because the distance L of the retention band 21 is less than the distance D between its union areas 31, 33 if not limited by the retention band 21, it produces a displacement of bag volume in the direction of the occupant that causes an increase in the contact surface of bag 11 with the occupant 15 as illustrated in FIG. 2b in comparison with FIG. 2a, which displays a bag without retention band 21, which results in a reduction of the force applied by the bag 11 to the occupant 15.

The retention band 21 shall be formed in order to have a straight section 25 in the area of the union 33 with the bag of a width A sufficient for its environment to adopt the aforementioned V shape.

In a preferential execution, width A of the straight section 25 is, at least, 5 cm.

Furthermore, the retention band 21 shall be conformed so as not to break during unfolding of the bag 11 in order to ensure the limitation of bag unfolding 11 in a direction parallel to the contact surface with the occupant 15 and not hinder gas circulation inside the bag 11.

FIGS. 5a to 5g show possible geometries of the retention band 21: rectangular bands with orifices on the inside (FIGS. 5a to 5f) or an I-shaped band (FIG. 5g).

Preferably the retention band 21 shall be made of the same fabric as the bag 11.

The retention band 21 can also be made of cords of materials such as PA (polyamide), polypropylene, polyethylene, paraamide or Kevlar sewn to the union areas 31, 33.

The airbag module as per this invention has an adaptive behaviour in the event of crashes of varying severity.

Impact severity translates into a different compression of the bag, i.e.: a different penetration of the occupant in the bag: the greater the severity, the greater the penetration. In the event of non severe impact, it is worth highlighting that 75% of the total bag capacity can be used to retain the occupant in the direction perpendicular to the bag contact surface with the occupant, while in the case of a severe impact, up to 100% of the bag capacity can be used, in which case the occupant may impact against certain vehicle areas.

With the airbag module as per the invention, a certain ventilation is achieved in the bag in less severe cases so that the impact is not too hard, while in the cases of greater severity, it ensures that the total capacity of the bag is not completely used to retain the occupant.

Figure 8A:
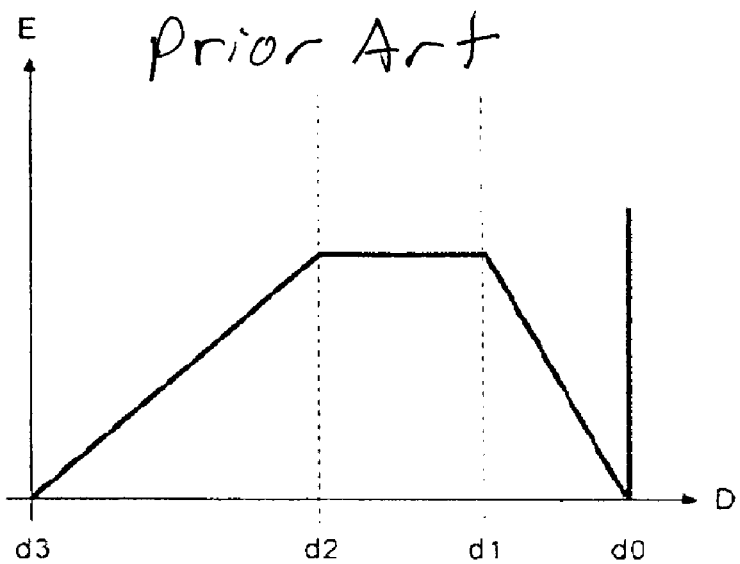
FIGS. 8a and 8b show Effort-Displacement charts illustrating the adaptive capacity of an airbag module as per this invention.
Figure 8B:
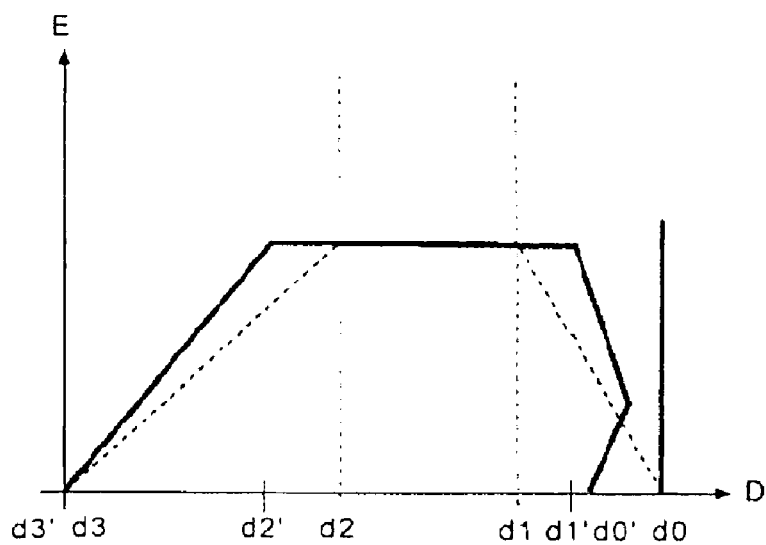

FIGS. 8b and 8a are effort charts, which are effort charts, which display, respectively, the Effort (E)/Displacement (D) of a lateral airbag with and without the ability to adapt to crashes of varying severity where E is the effort applied by the airbag on the occupant and D is the position of the occupant with regards to the vehicle door.

FIG. 8a shows three chart sections as a result of pressure evolution in the bag: in a first section, between displacement d3, when the airbag enters contact with the occupant, and displacement d2, the effort E increases constantly as a result of gas pressure increasing; in a second section, between displacement d2 and displacement d1, the effort E is constant the gas pressure increase is offset with leaks through the ventilation orifice, the bag fabric and if applicable by the seams of the panels; in the final section, between displacement d1 and displacement d0, in which the occupant would contact the vehicle door, the effort drops constantly by reducing gas pressure inside the bag.

Figure 3A:
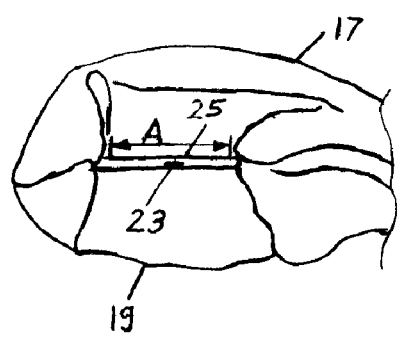
FIGS. 3a and 3b are photos that show the bag of a side airbag module unfolding as per this invention before and after impact, respectively.
Figure 3B:
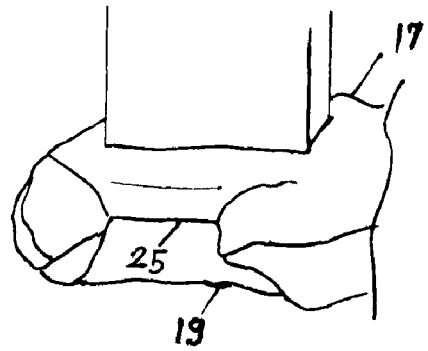

FIG. 8b, which includes next to the chart of the lateral airbag as per this invention the chart of FIG. 3a in line of points in the non-matching section, the following differences can be observed with regards to FIG. 8a:

- The first section, between displacement d3' and displacement d2' produces an advance in its end as the contact with the occupant occurs before as a result of displacing the bag volume towards the occupant, which increases contact surface.
- In the second section, there is a delay in its termination in displacement d1' by maintaining bag pressure for longer time as a result of covering the ventilation orifice.
- In the third section, a certain amount of gas remains inside the bag, which avoids the occupant from hitting the vehicle door. Its completion advances to displacement d0'.

This bag behaviour allows efficiently protecting one same occupant in different crash configurations at different intrusion speeds, for example, a crash configuration with two types of barrier and two speeds or a crash configuration with one barrier and three speeds.

Although the executions of the invention we have described refer to lateral airbag modules, any expert on this matter will easily understand that the invention is applicable to any airbag module and specifically to frontal airbags.

Although several executions of the invention have been described and represented, modifications can be made within its scope, and therefore should not be considered as limited to these executions, but the content of the following claims:

The invention claimed is:

1. An airbag module for protecting a vehicle occupant, the module comprising:
   - an inflatable bag including a main front panel for contacting the occupant and a main rear panel connected to the front panel;
   - a generator for generating a gas in the event of a collision to inflate the inflatable bag between the occupant and the vehicle
   - at least one retention band joined to the main front and rear panels in two opposite union areas of the edges of the main front and rear panels, the retention band being constructed and arranged to withstand a maximum pressure provided during the inflation of the bag without breaking or breaking loose from the main front and rear panels, and has a length L which is less than a maximum distance D between the opposite areas during the inflation of the bag had the retention band not been provided;
   - at least one ventilation orifice located in one of the main front and rear panels around one of the union areas of the retention band such that the orifice closes when the front and rear panels come closer to one another when the bag contacts the occupant.

2. An airbag module for protecting the occupant of a vehicle according to claim 1, wherein a relation between a length L of the retention band and said maximum distance D between the union areas ranges between 0.6 and 0.9.

3. An airbag module for protecting the occupant of a vehicle according to claim 1, wherein the retention band is connected to the ends of the main front and rear panels in a straight section with a width A of, at least, 5 cm.

4. An airbag module for protecting the occupant of a vehicle according to claim 3, further comprising a plurality of ventilation orifices around at least one of the union areas.

5. An airbag module for the protection of the occupant of a vehicle according to 4, wherein said plurality of orifices is distributed along both sides of the straight section delimited in said union areas.

6. An airbag module for protecting the occupant of a vehicle according to claim 1, wherein the retention band has a rectangular form with interior orifices to avoid hindering gas circulation.

7. An airbag module for protecting the occupant of a vehicle according to claim 1, wherein the retention band is I-shaped.

8. An airbag module for protecting the occupant of a vehicle according to claim 1, wherein the retention band consists of several cords.

9. An airbag module for protecting the occupant of a vehicle according to claim 1, wherein the bag is configured to protect the occupant against a lateral impact and wherein one of the union areas of the retention band is located on a part of the bag that is secured to the vehicle.

10. An airbag module for protecting the occupant of a vehicle according to claim 1, wherein the bag is configured to protect the occupant against a frontal impact.

* * * * *